June 16, 1953 H. C. RIEMANN 2,642,295
VEHICLE TOW COUPLING
Filed Sept. 8, 1952 2 Sheets-Sheet 1
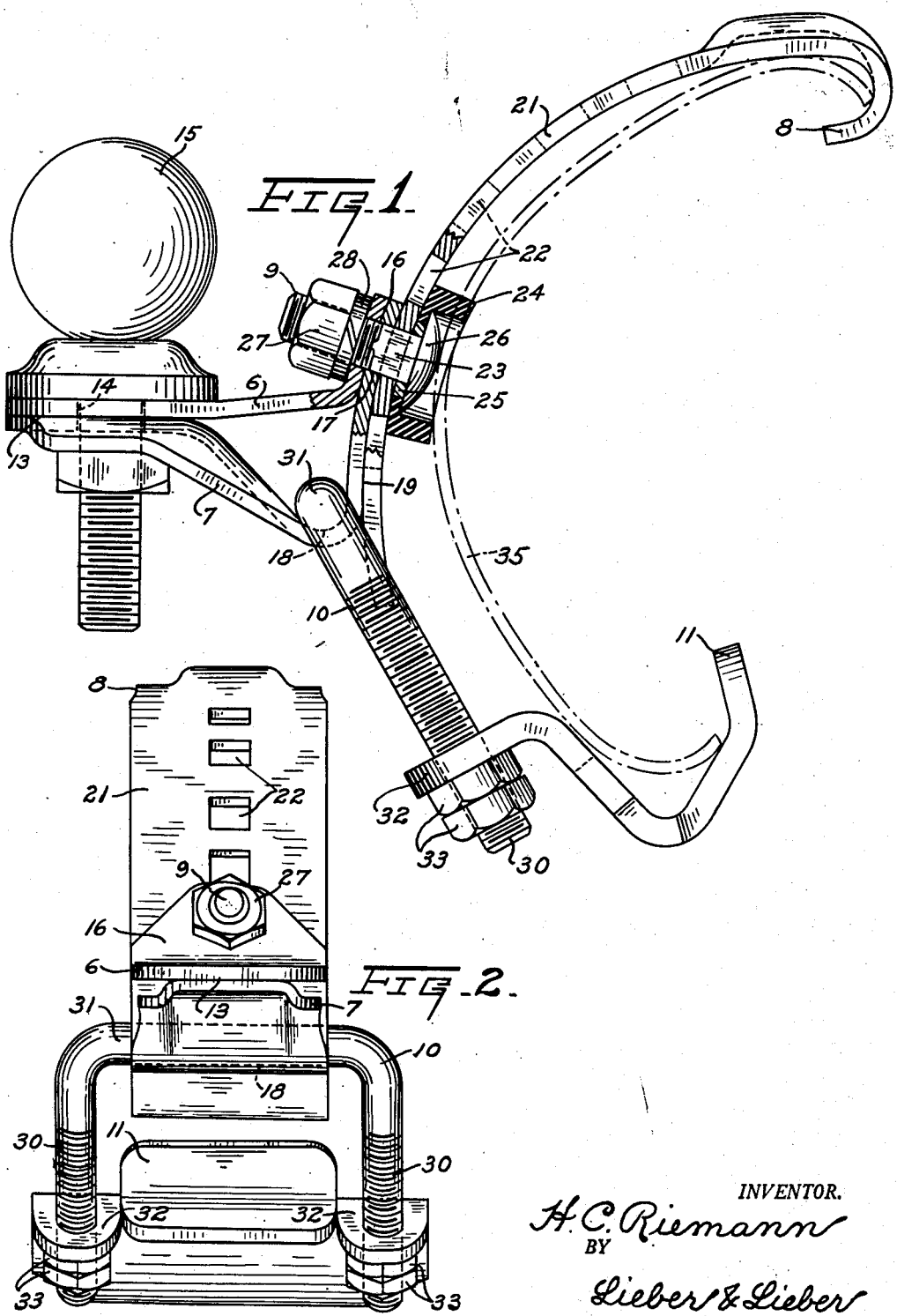
INVENTOR.
H. C. Riemann
BY
Lieber & Lieber
ATTORNEYS.

June 16, 1953    H. C. RIEMANN    2,642,295
VEHICLE TOW COUPLING

Filed Sept. 8, 1952    2 Sheets-Sheet 2

INVENTOR.
H. C. Riemann
BY
Lieber & Lieber
ATTORNEYS.

Patented June 16, 1953

2,642,295

UNITED STATES PATENT OFFICE 2,642,295

VEHICLE TOW COUPLING

Howard C. Riemann, West Allis, Wis., assignor to The Fulton Company, West Allis, Wis., a corporation of Wisconsin Application September 8, 1952, Serial No. 308,427

10 Claims. (Cl. 280—33.44)

The present invention relates in general to improvements in appliances for interconnecting two vehicles so that one may be hauled by the other, and relates more specifically to improvements in the construction and usage of tow clamps or couplings cooperable with the bumper of one or both of the interconnected vehicles.

The principal object of this invention is to provide an improved vehicular tow coupling which is simple but durable in construction, readily attachable to or removable from bumpers of various shapes, and most effective and dependable in use.

As shown in U. S. Patent No. 2,506,109 granted May 2, 1950, it has heretofore been proposed to provide a vehicle bumper tow clamp comprising in inverted U-shaped draft frame having a coupling attachment platform at one end and opposed integral side walls forming spaced sockets and connected at the opposite end of the frame to a transverse bracket spanning the space between the side walls, an upper bumper clamping jaw having an elongated arcuate supporting portion adjustable along and attachable to the bracket, an inverted U-bolt pivotally suspended from the frame wall sockets, and a lower bumper clamping jaw adjustable along and secured to the swinging ends of the U-bolt. While this prior device has proven relatively successful in commercial use it is unnecessarily complicated and difficult to construct, and since the lower jaw suspension sockets are formed in the edges of the upright frame walls it required the use of rather heavy sheet metal in order to form the frame sufficiently strong to prevent distortion of these walls when the couplings were subjected to heavy loads. Then too, while these prior clamp assemblages could be readily applied to most commercial bumper bars, they were not well adapted to fit bumpers having relatively narrow transverse cross-sections, but aside from these objections the patented tow clamps are highly satisfactory.

It is therefore an important object of the present invention to provide various improvements in the construction and operation of tow clamps of the general type covered by the said patent, whereby all objectionable features are eliminated while a simpler and universally applicable clamp assemblage results.

Another important object of this invention is to produce a compact and sturdy sheet-metal tow clamp unit, the major portion of which may be manufactured of relatively light sheet-metal stock with the aid of simple punches and dies, and which may therefore be produced at moderate cost.

A further important object of the invention is to provide an improved vehicular tow coupling having a conveniently reversible clamping jaw for facilitating attachment of the clamp to bumper bars having wide or narrow cross-sections of various shapes.

Still another object of this invention is to provide an exceedingly simple coupling clamp formed primarily of sheet-metal and other standard machine elements, and which may be quickly and firmly attached to a bumper bar and just as readily removed while being highly dependable in use.

These and other more specific objects and advantages of the invention, will be apparent from the following detailed description from which it will be noted that the gist of the improvement is the provision of a vehicle towing clamp of the bumper type comprising a draft frame formed of upper and lower firmly united sheet-metal members having a coupling attachment platform at one end and an upstanding arcuate wall at the opposite end, the upper member being flat between its ends while the lower member is provided with a transverse pivot socket between its ends of substantially the same width as the frame, an upper clamping jaw adjustably attachable to the frame wall, an inverted U-bolt swingably suspended from the frame socket, and a lower clamping jaw reversibly and adjustably attachable to the lower ends of the U-bolt bifurcations so as to properly cooperate with bumper bars having both wide and narrow transverse cross-sections.

A clear conception of the improved features constituting the present invention, and of the construction and the mode of utilizing a typical automobile tow clamp embodying the same, may be had by referring to the drawings accompanying and forming a part of this specification in which like reference characters designate the same or similar parts in the various views.

Fig. 1 is a part sectional side view of one of the improved vehicle tow clamp units, showing the same provided with a universal coupling ball and clampingly coacting with a typical bumper bar having relatively wide transverse cross-section as indicated in dot-and-dash lines;

Fig. 2 is a somewhat reduced end elevation of the tow clamp assembled as in Fig. 1, but with the coupling ball omitted;

Figure 3:
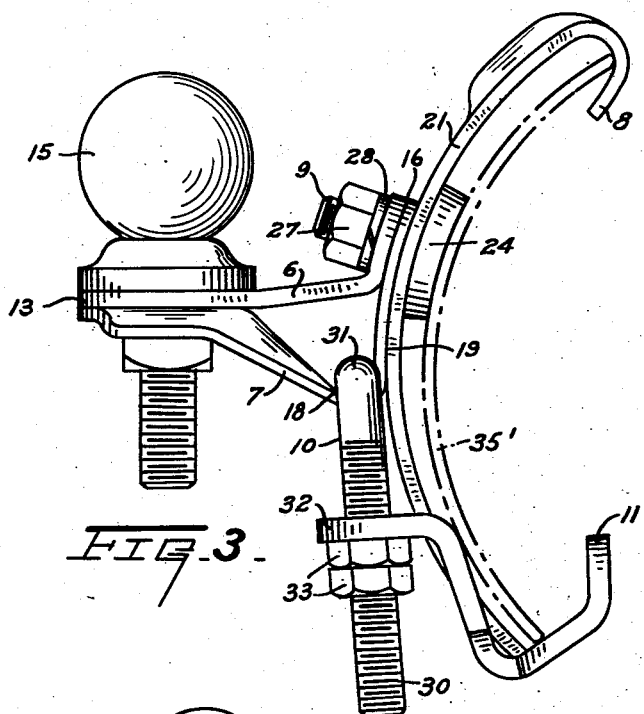
Figure 4:
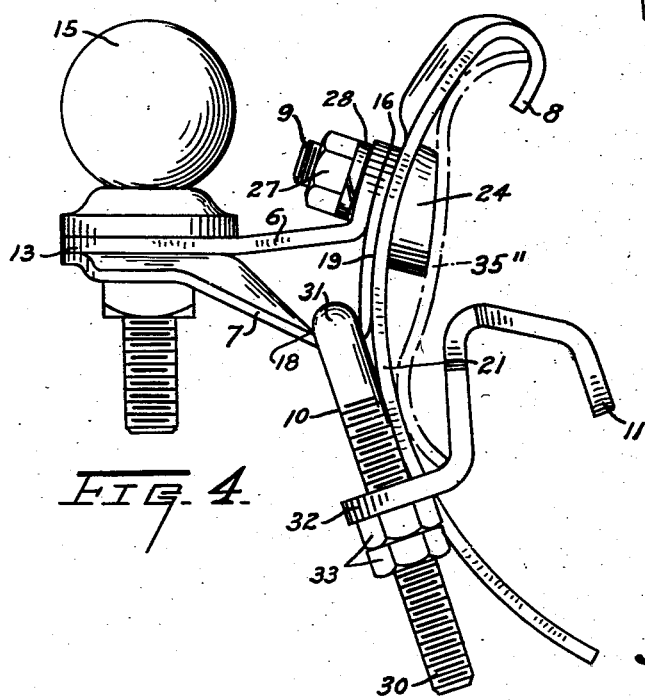

Fig. 3 is a similarly reduced side elevation of the same clamp unit, showing the same clamped to another typical vehicle bumper depicted in dot-and-dash lines and having somewhat less transverse width and less curvature than the bumper bar shown in Fig. 1; and Fig. 4 is a likewise reduced side view of the same clamp, showing the lower jaw reversibly coacting with still another typical bumper bar illustrated in dot-and-dash lines and of still less transverse width than the bumpers shown in the previous illustrations.

While only one specific embodiment of the improved tow clamp formed primarily of sheet-metal and adapted for cooperation with the ball of a universal coupling, has been shown and described herein, it is not the desire or intention to unnecessarily restrict the utility of the improved features by virtue of this limited showing; and it is also contemplated that specific descriptive terms used herein be given the broadest possible interpretation consistent with the disclosure.

Referring to the drawings, the improved automobile tow coupling shown therein may be applied to either the front or the rear bumper of either a hauling vehicle or a trailer, and comprises in general a main frame composed of upper and lower members 6, 7, respectively; an upper clamping jaw 8 adjustably attachable to the main frame by means of a stove bolt 9; an inverted U-bolt or element 10 pivotally suspended from the main frame; and a lower clamping jaw 11 reversibly and adjustably associated with the swingable ends of the U-bolt 10.

The main frame members 6, 7 are preferably formed of durable metal sheets with the aid of punches and dies, being welded or otherwise rigidly united at their opposite ends, and the adjacent ends of these members 6, 7 at one end of the frame provide a flat two-ply platform 13 having an opening 14 therein for the attachment of a universal coupling ball 15 or the like, while the opposite ends of the members 6, 7 are bent upwardly to provide an arcuate double wall 16 having a square opening 17 therethrough for the reception of the stove bolt 9. The upper sheet metal frame member 6 is substantially flat between its opposite ends, but the lower sheet-metal member 7 dips downwardly between its ends to provide a socket 18 and an elongated curved bearing surface 19 for the wall 16 both of which are of the same transverse width as the frame at its widest portion.

The upper clamping jaw 8 is also formed of durable sheet-metal and has an arcuately curved depending supporting portion 21 formed integral therewith and provided with a series of square holes 22 spaced apart and with which the square shank 23 of the stove bolt 9 is interchangeably cooperable in order to raise or lower the jaw 8 with respect to the main frame. The arcuate upper jaw supporting portion 21 is curved to snugly fit the curved surface 19 of the frame wall 16 in all positions of relative adjustment; and a resilient block 24 of rubber or the like, together with a special washer 25 may be applied to the concave surface of the jaw portion 21 beneath the head 26 of the stove bolt 16, but these are not essential and may be omitted. The square shank 23 of the stove bolt 9 is also adapted to snugly fit the opening 17 in the wall 16; and the threaded end of the bolt 9 is provided with a clamping nut 27 and with a lock washer 28.

The inverted U-bolt or element 10 is of relatively standard construction and has threaded depending elongated arms or bifurcations 30 connected to an integral transverse beam 31 which is pivotally seated throughout the major portion of its length within the elongated socket 18 which spans the main frame. The lower reversible clamping jaw 11 is also formed of durable sheet-metal and has opposite side ears 32 provided with through openings for receiving the U-bolt bifurcations 30, and the jaw 11 may be adjusted to various positions along these bifurcations and retained by means of nuts 33 and can also be swung fore and aft about the frame socket 18. The ears 32 of the lower jaw 11 may also be applied to the U-bolt bifurcations 30 in opposite directions in order to facilitate attachment of the clamp unit to various types of standard bumpers, as will be explained later.

When the improved bumper clamping unit has been properly constructed as above described, any suitable type of coupling element such as the ball 15 may be firmly attached to the frame platform 13 in any desired manner, and upon proper initial positioning of the upper and lower jaws 8, 11 the clamp may be readily finally attached to bumper bars of diverse cross-sections by merely manipulating the nuts 27, 33. As shown in Fig. 1, the improved unit has been rigidly attached to a bumper bar 35 having relatively wide transverse cross-section and great curvature, by applying the stove bolt 9 to one of the lower holes 22 in the upper jaw supporting portion 22, and by causing the nuts 33 to coact with the lower threaded ends of the U-bolt arms or bifurcations 30. As depicted in Fig. 3, the tow clamp has been likewise rigidly attached to an arcuate sectioned bumper bar 35' of less width and curvature, by applying the stove bolt 9 to a medial hole 22 in the upper jaw mounting portion 21 and by raising the lower jaw 11 with the aid of the adjusting and retaining nuts 33.

As illustrated in Fig. 4, the improved clamp has been firmly attached to a bumper bar 35" having a very narrow cross-section by reversing the lower jaw 11 relative to the inverted U-bolt 10, and by causing the stove bolt 9 to coact with an upper hole 22 in the upper jaw suspenson portion 21, while the nuts 33 have been caused to coact with medial portions of the U-bolt bifurcation threads. The clamp may obviously be applied to other bumpers of still less width by raising the nuts 33 toward the upper ends of the adjacent screw threads while the lower jaw 11 is reversed, thus providing a unit which may be readily applied to or removed from standard bumper bars of diverse shapes and of various transverse widths; and in any case the resilient blocks 24 may be utilized in order to prevent marring of the bumper bars, but are not necessary since the jaws 8, 11 alone may be drawn into tight clamping engagement with the edges of the bumpers and thus retained by the coacting nuts 33.

From the foregoing detailed description it should be apparent that the present invention in fact provides an improved bumper type clamp which is extremely simple, compact and durable in construction, as well as being conveniently attachable to bumper bars of various types. The improved construction of the main frame of two rigidly united upper and lower sheet-metal members 6, 7, not only permits the use of simple dies in the formation of the frame, but also provides a wide and uninterrupted pivot socket 18 for the U-bolt 10 and an extensive arcuate bearing surface 19 for the upper jaw supporting portion 21. The upper jaw 8 may be firmly clamped to this surface 19 with the aid of the single stove bolt 9 the square shank 23 of which coacts with the square opening 17 and holes 22 to positively prevent turning of the jaw 8 about the axis of this bolt. The rounded head 26 of the stove bolt 9 may also be utilized as a contact point with the bumper bar if the resilient block 24 is omitted.

The lower jaw 11 may also be formed of sheet-metal with the aid of simple punches and dies, and by forming this jaw so that it may be reversed, the improved unit may be effectively applied to either wide or narrow sectioned bumpers of diverse shapes. The clamp may also be quickly and conveniently removed, and the double nuts 33 and the lock washer 28 effectively retain the device in clamping condition. The tow clamps may be applied to either the front or rear bumpers of various types of automobiles, trucks and trailers, and may be manufactured at moderate cost due to the simplified sheet-metal construction of the main frame and jaws, and the use of standard nuts, bolts and washers in completing the assemblages.

It should be understood that it is not desired to limit this invention to the exact details of construction and to the precise mode of use of the tow clamp herein shown and described, since obvious modifications within the scope of the appended claims may occur to persons skilled in the art.

I claim:

1. In a vehicle bumper tow clamp, a draft frame comprising an upper member having a flat coupling attachment platform at one end and an integral upstanding wall at its opposite end and a lower member also having a platform at one end and an integral upstanding wall at its opposite end but being provided between said ends with an integral depending portion forming a transverse pivot socket extending entirely across the widths of said members, the platforms of said members being rigidly united and having a coupling attaching opening therein and said walls of the members also being rigidly united and having a polygonal opening therethrough, an upper bumper clamping jaw having an elongated supporting portion adjustably attachable to said walls at said polygonal opening, an inverted U-shaped element swingably suspended from said socket, and a lower bumper clamping jaw adjustably suspended from said element.

2. In a vehicle bumper tow clamp, a draft frame comprising an upper member having a flat coupling attachment platform at one end and an integral upstanding arcuate wall at its opposite end and a lower member also having a platform at one end and an integral upstanding similarly arcuate wall at its opposite end but being provided between said ends with an integral depending portion forming a transverse pivot socket extending entirely across the widths of said members, the platforms of said members being rigidly united and having a coupling attaching opening therein and said walls of the members also being rigidly united and having a polygonal opening therethrough, an upper bumper clamping jaw having a similarly arcuate elongated supporting portion adjustably attachable to said walls at said polygonal opening, an inverted U-shaped element swingably suspended from said socket, and a lower bumper clamping jaw adjustably suspended from said element.

3. In a vehicle bumper tow clamp, a draft frame comprising an upper member having a flat coupling attachment platform at one end and an integral upstanding wall at its opposite end and a lower member also having a platform at one end and an integral upstanding wall at its opposite end but being provided between said ends with an integral depending portion forming a transverse pivot socket extending entirely across the widths of said members, the platforms of said members being rigidly united and having a coupling attaching opening therein and said walls of the members also being rigidly united and having a polygonal opening therethrough, an upper bumper clamping jaw having an elongated supporting portion adjustably attachable to said walls at said polygonal opening, an inverted U-shaped element swingably suspended from said socket, and a lower bumper clamping jaw reversibly attachable to said element for cooperation with bumpers having different cross-sections.

4. In a vehicle bumper tow clamp, a draft frame comprising an upper member formed of sheet metal and having a flat coupling attachment platform at one end and an integral upstanding wall at its opposite end and a lower member also formed of sheet metal and having a platform at one end and an integral upstanding wall at its opposite end but being provided between said ends with an integral depending portion forming a transverse pivot socket extending entirely across the widths of said members, the platforms of said members being rigidly united and having a coupling attaching opening therein and said walls of the members also being rigidly united and having a polygonal opening therethrough, an upper bumper clamping jaw likewise formed of sheet metal and having an elongated supporting portion adjustably attachable to said walls at said polygonal opening, an inverted U-shaped element swingably suspended from said socket, and a lower bumper clamping jaw also formed of sheet metal and being adjustably suspended from said element.

5. In a vehicle bumper tow clamp, a draft frame comprising upper and lower sheet-metal members each having a flat coupling attachment platform at one end and an integral upstanding wall at its opposite end, said upper member having a flat portion connecting its end while said lower member is provided between said ends with an integral depending portion forming a transverse pivot socket extending entirely across the widths of said members, the platforms of said members being rigidly united and said walls of the members also being rigidly united and having a polygonal opening therethrough, an upper bumper clamping jaw having an elongated supporting portion adjustably attachable to said walls at said polygonal opening, an inverted U-shaped element swingably suspended from said socket, and a lower bumper clamping jaw adjustably suspended from said element.

6. In a vehicle bumper tow clamp, a draft frame comprising upper and lower rigidly united sheet-metal members each having a flat coupling attachment platform at one end and an integral upstanding arcuate wall at its opposite end, said lower member wall being of greater height than the upper member wall and said lower member being provided between said ends with an integral depending portion forming a transverse pivot socket extending entirely across the widths of said members, an upper bumper clamping jaw having a similarly arcuate elongated supporting portion adjustably coacting with said lower member wall and being attachable to said walls, an inverted U-bolt swingably suspended from said socket, and a lower bumper clamping jaw adjustably suspended from said U-bolt.

7. In a vehicle bumper tow clamp, a draft frame comprising rigidly united upper and lower sheet-metal members each having a flat coupling attachment platform at one end and an integral upstanding wall at its opposite end, said lower member being provided between said ends with an integral depending portion forming a transverse pivot socket extending entirely across the widths of said members, an upper bumper clamping jaw having an elongated supporting portion adjustably attachable to said walls, an inverted U-bolt swingably suspended from said socket, and a lower bumper clamping jaw reversibly attachable to said U-bolt for cooperation with bumpers having different cross-sections.

8. In a vehicle bumper tow clamp, a draft frame comprising rigidly united upper and lower members formed of sheet-metal and each having a coupling attachment platform at one end and an integral upstanding wall at its opposite end, said lower member being provided with an integral depending portion forming a continuous transverse pivot socket extending entirely across the widths of said members, an upper bumper clamping jaw likewise formed of sheet-metal and having an elongated supporting portion adjustable along said walls, a stove bolt for attaching said jaw supporting portion to said walls, an inverted U-bolt swingably suspended from said socket, and a lower bumper clamping jaw also formed of sheet-metal and being adjustably suspended from said U-bolt.

9. In a vehicle bumper tow clamp, a draft frame comprising rigidly united upper and lower sheet-metal members each having an approximately horizontal flat coupling attachment platform at one end and an integral approximately vertical wall at its opposite end, said lower member being provided between said ends with an integral downwardly inclined portion forming a transverse pivot socket extending entirely across the width of said member, an upper bumper clamping jaw having an elongated supporting portion adjustably attachable to said walls, an inverted U-bolt swingably suspended from said socket, and lower bumper clamping jaw means adjustably suspended from said U-bolt.

10. In a vehicle bumper tow clamp, a draft frame comprising rigidly united upper and lower sheet-metal members each having an approximately horizontal flat coupling attachment platform at one end and an integral approximately vertical wall at its opposite end, said lower member being provided between said ends with an integral downwardly inclined portion forming a transverse pivot socket extending entirely across the width of said member, an upper bumper clamping jaw having an elongated arcuate depending sheet-metal supporting portion adjustably attachable to both of said walls, an inverted U-bolt having its medial portion swingably suspended from said socket and being provided with depending threaded opposite ends, and lower bumper clamping jaw means adjustably suspended from said threaded U-bolt ends.

HOWARD C. RIEMANN.

References Cited in the file of this patent

UNITED STATES PATENTS

| Number | Name | Date |
|---|---|---|
| 2,432,249 | Pearson | Dec. 9, 1947 |
| 2,506,109 | Riemann et al. | May 2, 1950 |
| 2,516,459 | French et al. | July 25, 1950 |
| 2,542,907 | Dayton et al. | Feb. 20, 1951 |
| 2,595,711 | Schwork | May 6, 1952 |